(12) United States Patent
Xiao et al.

(10) Patent No.: US 11,792,105 B2
(45) Date of Patent: Oct. 17, 2023

(54) METHOD OF BUILDING A DYNAMIC OVERLAY NETWORK TOPOLOGY BASED ON CROSS-CHAIN INTERACTION BETWEEN BLOCKCHAINS AND DEVICE THEREFOR

(71) Applicant: Huazhong University of Science and Technology, Wuhan (CN)

(72) Inventors: Jiang Xiao, Wuhan (CN); Shijie Zhang, Wuhan (CN); Jiajie Zeng, Wuhan (CN); Hai Jin, Wuhan (CN); Chen Yu, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 304 days.

(21) Appl. No.: 17/249,838

(22) Filed: Mar. 16, 2021

(65) Prior Publication Data

US 2022/0182308 A1 Jun. 9, 2022

(30) Foreign Application Priority Data

Dec. 7, 2020 (CN) .......................... 202011421191.0

(51) Int. Cl.
*H04L 45/02* (2022.01)
*H04L 45/12* (2022.01)
(Continued)

(52) U.S. Cl.
CPC ........ *H04L 45/02* (2013.01); *G06F 18/24323* (2023.01); *H04L 45/123* (2013.01); *H04L 45/48* (2013.01); *H04L 45/74* (2013.01)

(58) Field of Classification Search
CPC ....... H04L 45/02; H04L 45/123; H04L 45/48; H04L 45/74; G06F 18/24323
(Continued)

(56) References Cited

U.S. PATENT DOCUMENTS

| 2007/0110024 | A1 | 5/2007 | Meier | |
|---|---|---|---|---|
| 2011/0090787 | A1* | 4/2011 | Smith | ...................... H04L 45/32 |
| | | | | 370/256 |
| 2019/0172026 | A1* | 6/2019 | Vessenes | ............ G06Q 20/3674 |

FOREIGN PATENT DOCUMENTS

| CN | 108900585 | | 11/2018 |
|---|---|---|---|
| CN | 110266655 | A | 9/2019 |

(Continued)

OTHER PUBLICATIONS

Allowed corresponding Patent Application No. 202011421191.0 dated Apr. 1, 2022. (No English translation).
(Continued)

*Primary Examiner* — Hermon Asres
(74) *Attorney, Agent, or Firm* — Michael Ye; Rimon Law

(57) ABSTRACT

The present invention relates to a method of building a dynamic overlay network topology based on cross-chain interaction between blockchains, at least comprising: selecting at least one gateway node and at least one ordinary node from at least one cross-chain interaction node; clustering the ordinary nodes into ordinary node clusters based on a clustering algorithm; building a structured network topology and cross-chain connections between the cross-chain interaction nodes based on the gateway node; performing topology building on the ordinary node clusters based on a breadth-first spanning tree algorithm.

13 Claims, 3 Drawing Sheets

(51) Int. Cl.
 *H04L 45/48* (2022.01)
 *H04L 45/74* (2022.01)
 *G06F 18/243* (2023.01)
(58) Field of Classification Search
 USPC .......................................................... 709/249
 See application file for complete search history.

(56) References Cited

FOREIGN PATENT DOCUMENTS

| | | |
|---|---|---|
| CN | 110519085 | 11/2019 |
| CN | 111770017 A | 10/2020 |

OTHER PUBLICATIONS

Chinese Office action dated Aug. 6, 2021 in corresponding Chinese Application No. 202011421191.0. (No English translation).

\* cited by examiner

METHOD OF BUILDING A DYNAMIC OVERLAY NETWORK TOPOLOGY BASED ON CROSS-CHAIN INTERACTION BETWEEN BLOCKCHAINS AND DEVICE THEREFOR

CROSS-REFERENCE TO RELATED APPLICATIONS

This application claims the benefit of the Chinese Patent Application No. CN202011421191.0 filed on Dec. 7, 2020, which is hereby incorporated by reference as if fully set forth herein.

BACKGROUND

1. Technical Field

The present invention relates to blockchain technologies, and more particularly to a method of building a dynamic overlay network topology based on cross-chain interaction between blockchains and a device therefor.

2. Description of Related Art

As the blockchain technologies continuously develop, various blockchain platforms have been introduced. However, due to independence of designs, direct interaction among different kinds of blockchains is often a challenge, letting blockchains be value islands and therefore significantly limiting further applications and development of blockchain technologies.

For achieving value circulation among different blockchains, it is necessary to connect independent blockchain networks to allow value interaction, Cross-chain technologies thus came into being and have gradually become a research hotspot. At present, dominating cross-chain interaction technologies include notary schemes, sidechains/relays, Hash-locking and distributed private key control. These cross-chain interaction technologies are mainly focused on how to process and verify cross-chain transactions, yet pay less attention on optimization of cross-chain networking and communication. A cross-chain network plays an important role in cross-chain interaction, as it enables communication and transmission among different chains, and thus a key factor that has influence on cross-chain consensus and efficiency of processing of cross-chain transactions.

Structurally, existing cross-chain schemes are usually realized using random network topologies and star network topologies. In a random network topology (opposite to a structured network topology), different blockchains are connected to a common relay network and then can interact with other blockchain systems. Nodes in such a relay network are randomly connected. In a star network topology, blockchain systems are connected to a centralized blockchain platform that process interaction requests between individual blockchains. The two kinds of network topologies nevertheless are defective for their inadequate consideration to network latency raised from connections between nodes. When a huge number connections of high latency exists in a network, the transmission efficiency of the network can be significantly degraded, leading to inefficient cross-chain interaction. As to routing protocols, the foregoing two kinds of network topologies use flooding routing and centralized routing algorithms, respectively. Both of these two routing algorithms, however, have problems related to scalability. In a node in a randomly network topology cannot acquire information about other nodes in the same network and information about network connection without flooding operation because there is not a centralized node in the network. When there is a large number of nodes in the network, such operation can consume considerable network resources, and in turn degrade cross-chain interaction. A star network topology avoids this problem, but its centralized node can form a bottleneck when it comes to cross-chain interaction. In other words, the efficiency of the network in processing cross-chain requests is determined by the performance of the centralized node. Additionally, interdiction of such a centralized node not only goes against decentralization as the design principle of a blockchain system, but also degrades the system in terms of security.

For example, China Patent Publication No. CN109951467A discloses a data interaction system, method and device based on blockchains. The system comprises at least two data interaction objects and N contract addresses, wherein N is natural number. The at least two data interactions object and the N contract addresses collectively form a tree topology. Each of the at least two data interaction objects acts as an endpoint node and each of the N contract addresses acts as a connecting node which is a non-end node. Therein, N data interaction contracts have been arranged between the at least two data interaction objects, and the N contract addresses correspond to the N data interaction contracts in a one-to-one manner. A blockchain contract conversion module converts the data interaction contracts into N blockchain intelligence contracts by carrying out intelligently parsing. The data interaction system is based on the N blockchain intelligence contracts to carry out data distribution between the at least two data interaction objects. The framework of these contracts can support nesting of data interaction agreements of arbitrary number of levels, thereby providing a pluggable effect. However, the known solution still fails to overcome the shortcomings of the prior art.

Therefore, there are two main issues about cross-chain interaction in terms of network communication. The first issue is that different chains may use different network topologies and communication protocols, causing difficulty in direct communication. Secondary, as the currently used network topology structures and routing mechanisms are not satisfying in terms of network latency and scalability, the requirements of desired cross-chain interaction have not been well met.

Since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with the related art more existing technical features as support according to relevant regulations.

SUMMARY

In view of the shortcomings of the prior art, the present invention provides a method of building a dynamic overlay network topology based on cross-chain interaction between blockchains, which at least comprises:

selecting at least one gateway node and at least one ordinary node from at least one cross-chain interaction node;

clustering the ordinary nodes into ordinary node clusters based on a clustering algorithm;

building a structured network topology and cross-chain connections between the cross-chain interaction nodes based on the gateway node; and performing topology building on the ordinary node clusters based on a breadth-first spanning tree algorithm.

The method of the present invention features discrimination and selection of the gateway node and the ordinary node, and the resulting dynamic network topology reflects adequate consideration to network latency between nodes, thereby ensuring high-speed data transmission between nodes. Moreover, the structured network topology of the present invention is highly adaptive to an increased number of nodes. This allows gateway nodes and ordinary nodes of different blockchain systems to be dynamically introduced and connected, thereby forming an autonomous network topology across multiple blockchains that is of high scalability and robustness.

Preferably, selecting the at least one said gateway node is achieved by:
selecting the gateway node based on a trust of historical transaction information and/or an online time; and
after the gateway node is determined, naming the remaining cross-chain interaction node(s) as the ordinary node(s).

Preferably, the gateway node is such selected that:
the node showing the relatively high trust in historical transactions, and/or the node having the relatively long online time is selected as the gateway node.

Preferably, clustering the ordinary nodes into the ordinary node clusters based on the clustering algorithm is achieved by:
with the nodes having been assigned with corresponding coordinates, adjusting the specific coordinates of the nodes based on actual network latencies of the nodes; and
clustering the ordinary node based on a Meanshift clustering algorithm.

Preferably, a mean vector is recomputed during every iterative operation using the Meanshift clustering algorithm, in which the mean vector is computed using an equation of:

$$M_h(n) = \frac{\Sigma_{n_i \in S_h} \left[ G\left\{ \frac{n_i - n}{h} \right\} * (n_i - n) \right]}{\Sigma_{n_i \in S_h} \left[ G\left\{ \frac{n_i - n}{h} \right\} \right]}$$

where $$G\left\{ \frac{n_i - n}{h} \right\}$$

is a Gaussian kernel function; h represents a magnitude of a bandwidth; and $n_i$ represents a number of the ordinary nodes in a certain spherical region $S_h$ having a radius of h.

Preferably, $S_h$ is defined as:

$$S_h(n) = \{y : (y - n_i)^T (y - n_i) < h^2\},$$

where y represents the number of the nodes meeting a predetermined condition, T represents a transpose symbol, and h represents a magnitude of a bandwidth.

The present invention combines the network coordinate system and the clustering algorithm to accurately represent the network latency between the network nodes as a coordinate distance, which can be regarded as a convenient basis for measurement using the clustering algorithm. With the use of the clustering algorithm to cluster ordinary nodes, the present invention limits network latency between ordinary nodes in each cluster to a relative low interval, thereby accomplishing low-latency communication between ordinary nodes.

Preferably, performing topology building on the ordinary node clusters based on the breadth-first spanning tree algorithm is achieved by:
randomly selecting a root node based on the breadth-first spanning tree algorithm to build the network topology; and
the root node, forwarding a cross-chain network request information from the ordinary nodes in the cluster to the gateway node for processing.

The present invention employs the breadth-first spanning tree algorithm to connect the ordinary nodes, thereby forming the in-cluster network topology. The root node of the spanning tree is a cluster-head node. The cluster-head node has to measure the network latency of the gateway nodes on the present chain and accordingly get connection with the gateway node having the least network latency. The cluster-head node is responsible for communication among all the ordinary nodes and the gateway nodes in the cluster by forwarding cross-chain requests to the gateway nodes for. Through cross-chain interaction, a cross-chain message can be sent to a corresponding node on a destination chain in a fast and accurate manner.

The present invention also provides a device for building a dynamic overlay network topology based on cross-chain interaction between blockchains that comprises a topology building module. The topology building module is configured to perform steps of:
selecting at least one gateway node and at least one ordinary node from at least one cross-chain interaction node;
clustering the ordinary nodes into ordinary node clusters based on a clustering algorithm;
building a structured network topology and cross-chain connections between the cross-chain interaction nodes based on the gateway node; and
performing topology building on the ordinary node clusters based on a breadth-first spanning tree algorithm.

Preferably, the device further comprises a route computing module that is configured to perform a routing algorithm involving:
acquiring routing tables maintained by the nodes;
comparing an address of the current node with a destination address specified in a received request message to see whether the two addresses are the same; if the two addresses are the same, determining that the message has arrived at the destination node, and ending performance of the routing algorithm;
if the two addresses are not the same, checking whether the routing table contains the destination address; if the routing table contains the destination address, performing forwarding directly;
if the routing table does not contain the destination address, determining whether the chain number of the node and the chain number of the destination are the same; if the chain number of the node and the chain number of the destination are the same, sending the message to the gateway node that is closest to that chain number for further processing; and if the chain number of the node and the chain number of the destination are not the same, sending the message to the gateway node for processing. The present invention uses the routing algorithm to allow information to rapidly and accurately forward cross-chain requests from the original chain node to the corresponding node on the destination chain, thereby accomplishing cross-chain interaction.

The present invention also provides an information forwarding method for a network topology based on cross-chain interaction between blockchains. The information forwarding method comprises:

after the network topology has been built, acquiring routing tables maintained by the nodes;

comparing an address of the current node with a destination address specified in a received request message to see whether the two addresses are the same; if the two addresses are the same, determining that the message has arrived at the destination node, and ending performance of the routing algorithm;

if the two addresses are not the same, checking whether the routing table contains the destination address; if the routing table contains the destination address, performing forwarding directly;

if the routing table does not contain the destination address, determining whether a chain number of the node and the chain number of the destination are the same; if the chain number of the node and the chain number of the destination are the same, sending the message to the gateway node that is closest to that chain number for further processing; and if the chain number of the node and the chain number of the destination are not the same, sending the message to the gateway node for processing;

wherein, the network topology has been built by:

building a structured network topology and cross-chain connections between the cross-chain interaction nodes based on the selected gateway node; and performing topology building on selected ordinary node clusters based on a breadth-first spanning tree algorithm.

The routing algorithm of the present invention prevents the defects of the prior art, such as flooding routing that consumes large resources and centralized routing that has limited performance. The disclosed algorithm selectively selects the relevant node based on the address features contained in the current information, thereby rapidly and accurately forwarding cross-chain requests to a destination chain.

DETAILED DESCRIPTION OF THE INVENTION

The present invention will be described in detail with reference to the accompanying drawings.

To address the shortcomings of the prior art, the present invention provides a method of building a dynamic overlay network topology based on cross-chain interaction between blockchains and a device therefor, with the aim to efficient cross-chain interaction by reducing latency in the cross-chain network.

Embodiment 1

Figure 1:
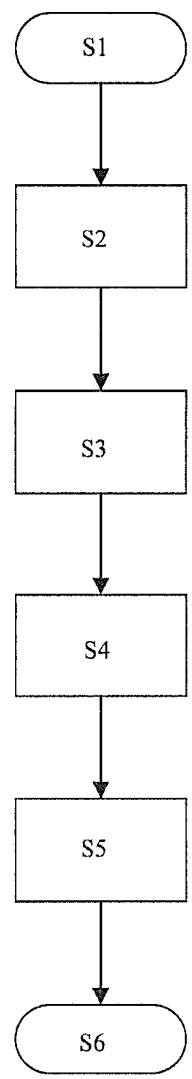
FIG. 1 is a logic chart showing steps of building a network topology according to the present invention.

FIG. 1 depicts a method of building a dynamic overlay network topology based on cross-chain interaction between blockchains as disclosed in the present invention. The comprises the following steps:

S1: start;

S2: selecting at least one gateway node and at least one ordinary node from at least one cross-chain interaction node on which uniform network regulations are running;

S3: clustering the ordinary nodes into ordinary node clusters based on a clustering algorithm;

S4: building a structured network topology and cross-chain connections between the cross-chain interaction nodes based on the gateway node;

S5: performing topology building on the ordinary node clusters based on a breadth-first spanning tree algorithm; and S6: end.

Specifically, the step of selecting the gateway node and the ordinary node from the cross-chain interaction node on which uniform network regulations are running is achieved through the following process.

Since different blockchain systems have different designs in their network layers, direct communication across blockchains is impossible without additional arrangements, such as expanding a second layer on an existing blockchain node. To be specific, only when every node has a cross-chain interaction node with uniform network regulations, cross-chain communication is possible. With the uniform cross-chain interaction nodes provided on the nodes of the existing diverse blockchains, the present invention allows cross-chain requests and data exchange, thereby achieving mutual communication between blockchains.

Inspired by the fact that different autonomous system (ASs) interact over the Internet by means of gateway servers, the present invention divides network nodes for cross-chain interaction into two types, namely gateway nodes and ordinary nodes.

Therein, a gateway node processes incoming cross-chain requests for the local chain and has cross-chain network connection with gateway nodes on other blockchains, thereby accomplishing cross-chain interaction. An ordinary node accurately sends a cross-chain request in the blockchain to the gateway node for processing. While an ordinary node is in connection with the gateway nodes and other ordinary nodes of the local chain, it is unable to process a cross-chain request.

The step of selecting the gateway node and the ordinary node from the cross-chain interaction nodes is achieved by: selecting the gateway node based on a trust of historical transaction information and/or an online time. after the gateway node is determined, naming the remaining cross-chain interaction node(s) as the ordinary node(s).

Due to the particularity of cross-chain interaction, the selection of gateway nodes is of great importance. Since the gateway node is used to connect an external blockchain network, the gateway node should have a network behavior that is as stable as possible, so as to ensure reliable transmission over the cross-chain network. In the present invention, nodes showing the relatively high trust in historical transactions, or nodes having the relatively long online time are selected as the gateway nodes. This is because high-trust or long-online nodes are relatively stable in terms of network behavior, and unlikely to be unintentionally offline or be malicious, thereby ensuring stable cross-chain transmission.

For example, in the present invention, $\sqrt{n}$ gateway nodes $g_i$ are selected depending on the network scale of different blockchain systems, and the remaining nodes are ordinary nodes $n_i$, where n is the total number of nodes in a certain blockchain systems for implementing cross-chain interaction.

After the gateway nodes and the ordinary nodes have been determined, the present invention involves clustering the ordinary nodes to group neighboring nodes in the network together, thereby providing low-latency network transmission. The step of clustering the ordinary nodes into ordinary node clusters based on the clustering algorithm is achieved by:

assigning the gateway node and the ordinary node in the network with corresponding coordinates; and
recomputing a mean vector during every iterative operation.

Specifically, the present invention can use, for example, a Vivaldi network coordinate system to provide nodes in the network with corresponding coordinates. A Vivaldi network coordinate system can such adjust the coordinate of a node according to the actual network latency of the node that the distance between nodes in the coordinate system can accurately reflect the network latency between the nodes, making it more convenient for the clustering algorithm to cluster nodes in the neighboring area.

The present embodiment employs the Meanshift clustering algorithm to cluster the ordinary nodes. Compared to other clustering algorithms, the Meanshift algorithm performs clustering totally depending on distribution of samples in data, without the need of specifying the exact number of the clusters in advance, and with higher robustness against outliers. The Meanshift algorithm requires the mean vector to be computed during every iterative operation. Therein, the mean vector is computed using an equation of:

$$M_h(n) = \frac{\Sigma_{n_i \in S_h}\left[G\left\{\frac{n_i - n}{h}\right\} * (n_i - n)\right]}{\Sigma_{n_i \in S_h}\left[G\left\{\frac{n_i - n}{h}\right\}\right]}$$

where $$G\left\{\frac{n_i - n}{h}\right\}$$

is a Gaussian kernal function; h represents a magnitude of a bandwidth; and $n_i$ represents a number of the ordinary nodes in a certain spherical region $S_h$ having a radius of h. $S_h$ is defined as:

$$S_h(n) = \{y : (y-n_i)^T(y-n_i) < h^2\}.$$

Therein, the bandwidth h of the Gaussian kernel function is the radius h of the spherical region. The two values are the same. The magnitude of the bandwidth h determines the number of ordinary nodes in each cluster. The greater the bandwidth is, the more nodes are in the cluster, and the smaller the number of the clusters is. On the contrary, the smaller the bandwidth is, the fewer nodes are in the cluster, and the greater the number of the clusters is. Therefore, in actual computation, the magnitude of the bandwidth should be reasonably designed according to practical situation, so as to ensure that every cluster has a proper number of nodes.

Figure 2:
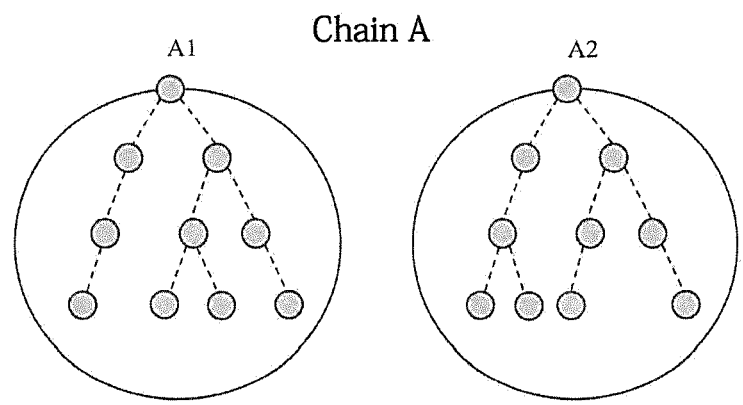
FIG. 2 is a structural diagram of an in-chain network topology according to the present invention.
Figure 3:
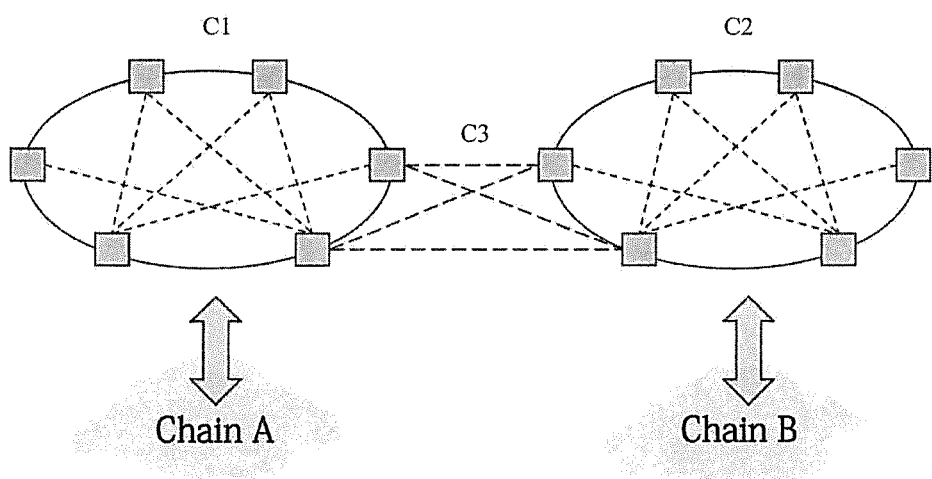
FIG. 3 is a structural diagram of a network topology for blockchain cross-chain interaction according to the present invention.

After clustering of ordinary nodes has been finished, network connections among all the nodes are to be built, so as to form a specific network topology structure, as shown in FIG. 2 and FIG. 3. The step of building the structured network topology and cross-chain connections between the cross-chain interaction nodes based on the gateway node is achieved by:

the gateway nodes on the same chain building network connection with neighboring gateway nodes based on the structured network topology; and
the gateway nodes selecting at least two foreign chain gateway nodes having the least latency based on network latency information between then and the foreign chain network nodes for building the cross-chain network connection.

Specifically, each of the gateway nodes on the same chain maintains network connection with the other gateway nodes by means of a structured network topology, namely Chord. Additionally, every gateway node measures the network latency of gateway nodes on foreign chains, and selects the foreign chain gateway node with the least latency to build the cross-chain network connection.

As shown in FIG. 2, for a first ordinary node cluster A1 and a second ordinary node cluster A2 on Chain A, network connections are built with neighboring gateway nodes according to the structured network topology.

As shown in FIG. 3, the first gateway connected to a topology C1 belongs to Chain A. The second gateway connected to a topology C2 belongs to Chain B. Chain A and Chain B are in cross-chain connection. In particular, a gateway node on Chain A and a gateway node on Chain B are in cross-chain connection, thereby forming cross-chain interaction to connect a topology C3.

Preferably, performing topology building on the ordinary node clusters based on a breadth-first spanning tree algorithm is achieved by:

randomly selecting a root node based on the breadth-first spanning tree algorithm to build the network topology; and
by the root node, forwarding a cross-chain network request information for the ordinary nodes in the cluster to the gateway node for processing.

The step of randomly selecting the root node based on the breadth-first spanning tree algorithm to build the network topology is achieved through the process below.

The breadth-first spanning tree algorithm randomly selects a root node form every ordinary node network cluster for building the network topology. The root node is used to forward cross-chain network requests of the ordinary nodes in the cluster to the gateway node for processing, so the root node has to be connected to the gateway node of the local chain. The root node measures the network latency between the local chain network nodes, and gets connection with the gateway node that has the least network latency. In addition, the present embodiment can maintain network connection even if nodes dynamically join or leave the network over time, thereby ensuring normal operation of the network.

The gateway node continuously collects information about other foreign chain gateway nodes. Once the cross-chain connection is interrupted, it will connect another available foreign chain gateway node. When dynamic change in the local gateway nodes happens, the Chord protocol provides a mechanism to maintain the connections. When there is a new ordinary node introduced into the network, the Chord protocol finds the closest node cluster using the Meanshift clustering algorithm to add the new ordinary node. When an ordinary node leaves the node cluster, the connections in the cluster will be rebuilt according to the breadth-first spanning tree algorithm. Thereby, the method of the present embodiment has relatively high scalability and robustness.

The root node uses the routing algorithm to forward a chain network request of an ordinary node to a gateway node on a destination chain through the following process.

After the network topology structure has been built, the root node accurately forwards the cross-chain network request to the corresponding node on the destination chain using a routing forwarding function. The known cross-chain routing algorithms come in two types, namely flooding routing and centralized routing. Flooding routing is conducted by a node to send messages to all its neighbor nodes, so as to continuously enquire a path to the destination node. The neighbor nodes also broadcast to their neighbor nodes, until the destination node is found. Flooding routing can consume considerable network resources when finding the routing path, leading to low efficiency. Centralized routing is conducted by having a centralized router that routes all requests. The node directly sends the request to the centralized node, and the centralized node forwards the request. Compared to flooding routing, centralized routing is more efficient, but introduction of the centralized routing node goes against the conception of decentralization of a blockchain network. In addition, centralized routing has its capacity a determining factor to the overall routing efficiency of the system, and possibly a bottleneck to the entire routing process. Based on the built network topology structure, the present invention provides a novel routing algorithm, which can rapidly and accurately forward a cross-chain network request to a corresponding node on a destination chain.

During routing for forwarding, nodes have to be identified. Therefore, the present invention further provides a hierarchical denomination for identifying individual nodes. Therein, the identifier of a node is composed of three parts, and written as "chain number-gateway number-node number". Nodes on the same blockchain share a common chain number. The node number of a gateway node is 0, and the node number of a cluster head node is 1.

Figure 4:
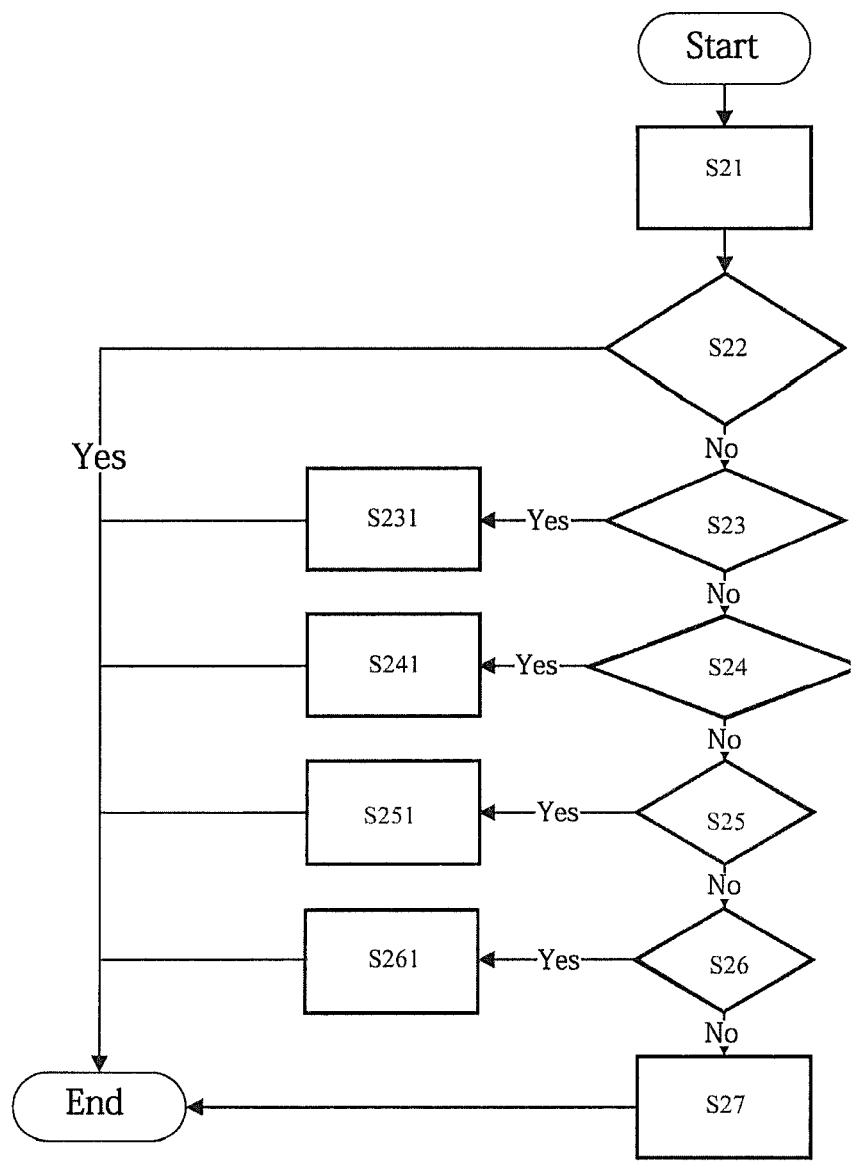
FIG. 4 is a flowchart of a network routing algorithm according to the present invention.

FIG. 4 shows the flow of the routing algorithm. The algorithm involves the following steps:

S21: acquiring routing tables maintained by the nodes;
S22: comparing an address of the current node with a destination address specified in a received request message to see whether the two addresses are the same; and if the two addresses are the same, determining that the message has arrived at the destination node, and ending performance of the routing algorithm;
S23: if the two addresses are not the same, checking whether the routing table contains the destination address; and if the routing table contains the destination address, performing forwarding directly; and
S24: if the routing table does not contain the destination address, determining whether a chain number of the node and the chain number of the destination are the same; and if the chain number of the node and the chain number of the destination are the same, determining that the message can achieve the destination chain, and it is necessary to send the message to the gateway node closest to the chain number for further processing;
S25: if the chain number of the node and the chain number of the destination are not the same, determining that the message is still on the original chain and has to be sent to the gateway node for processing, wherein, according to the network topology structure, the ordinary node first forwards the message to the cluster head node, and then the cluster head node forwards the message to the gateway node; and
S26: if none of the foregoing determination criteria is met, determining that the current node lack for information of the corresponding gateway node and has to send request to all the gateway nodes it knows so as to let one of the neighbor gateway nodes do further processing; and ending the routing process after the processing.

The routing algorithm of the present invention can rapidly and accurately forward a cross-chain request from the original chain node to the corresponding node on the destination chain, thereby accomplishing cross-chain interaction.

Embodiment 2

The present embodiment is further explanation of Embodiment 1, so the similarity will not be repeatedly described herein.

The present invention further provides a device for building a dynamic overlay network topology based on cross-chain interaction between blockchains, or a dynamic overlay network device based on cross-chain interaction between blockchains.

The disclosed device comprises a topology building module and a route computing module. The topology building module may be one or more of a server, a computer, a single-chip microcomputer, and an application specific integrated chip that is configured to build a topology for the nodes.

The route computing module performs routing computation based on the built network nodes. The route computing module may be one or more of a server, a computer, a single-chip microcomputer, and an application specific integrated chip that is configured to perform routing computation.

Specifically, the topology building module when running performs the following process:

S1: start;
S2: selecting at least one gateway node and at least one ordinary node from at least one cross-chain interaction node that has uniform network regulations running thereon;
S3: clustering the ordinary nodes into ordinary node clusters based on a clustering algorithm;
S4: building a structured network topology and cross-chain connections between the cross-chain interaction nodes based on the gateway node;
S5: performing topology building on the ordinary node clusters based on a breadth-first spanning tree algorithm; and
S6: end.

The dynamic network topology building module provided by the present invention reflects adequate consideration to network latency between nodes, thereby ensuring high-speed data transmission between nodes. Moreover, the structured network topology of the present invention is highly adaptive to an increased number of nodes. This allows gateway nodes and ordinary nodes of different blockchain systems to be dynamically introduced and connected, thereby forming an autonomous network topology across multiple blockchains that is of high scalability and robustness.

The route computing module when running performs the following process:

S21: acquiring routing tables maintained by the nodes;

S22: comparing an address of the current node with a destination address specified in a received request message to see whether the two addresses are the same. if the two addresses are the same, determining that the message has arrived at the destination node, and ending performance of the routing algorithm;

S23: if the two addresses are not the same, checking whether the routing table contains the destination address;

S231: if the routing table contains the destination address, performing forwarding directly;

S24: if the routing table does not contain the destination address, determining whether a chain number of the node and the chain number of the destination are the same;

S241: if the chain number of the node and the chain number of the destination are the same, determining that the message can achieve the destination chain, and it is necessary to send the message to the gateway node closest to the chain number for further processing;

S25: if the chain number of the node and the chain number of the destination are not the same, determining that the message is still on the original chain and has to be sent to the gateway node for processing, wherein, according to the network topology structure, sending the information to the ordinary node first;

S251: the ordinary node first forwarding the message to the cluster head node, and the cluster head node forwarding it to the gateway node;

S26: if none of the foregoing determination criteria is met, determining that the current node lack for information of the corresponding gateway node;

S261: the gateway node sending requests to all the neighbor gateway nodes it knows; and S27: the gateway node further processing all the gateway nodes, and then the routing process ending.

The routing algorithm executed by the route computing module of the present invention can rapidly and accurately forward a cross-chain request from the original chain node to a corresponding node on a destination chain, thereby accomplishing cross-chain interaction.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

The description of the present invention contains various inventive conceptions, and a paragraph herein led by any of "preferably," "according to one preferred mode," and "optionally" represents a disclosure of an independent conception of the present invention. The applicant reserves the right to file a divisional application for any of these conceptions.

What is claimed is:

1. A method of building a dynamic overlay network topology based on cross-chain interaction between blockchains, comprising:
   selecting at least one gateway node and at least one ordinary node from at least one cross-chain interaction node;
   clustering the ordinary nodes into ordinary node clusters based on a clustering algorithm;
   building a structured network topology and cross-chain connections between the cross-chain interaction nodes based on the gateway node;
   performing topology building on the ordinary node clusters based on a breadth-first spanning tree algorithm,
   wherein selecting the at least one said gateway node is achieved by:
   selecting the gateway node based on a trust of historical transaction information and/or an online time; and
   after the gateway node is determined, naming the remaining cross-chain interaction node(s) as the ordinary node(s).

2. The method of claim 1, wherein clustering the ordinary nodes into the ordinary node clusters based on the clustering algorithm is achieved by:
   with the nodes having been assigned with corresponding coordinates, adjusting the specific coordinates of the nodes based on actual network latencies of the nodes; and
   clustering the ordinary node based on a Meanshift clustering algorithm.

3. The method of claim 2, wherein,
   a mean vector is recomputed during every iterative operation using the Meanshift clustering algorithm, in which the mean vector is computed using an equation of:

$$M_h(n) = \frac{\sum_{n_i \in S_h}\left[G\left\{\frac{n_i - n}{h}\right\} * (n_i - n)\right]}{\sum_{n_i \in S_h}\left[G\left\{\frac{n_i - n}{h}\right\}\right]}$$

where $$G\left\{\frac{n_i - n}{h}\right\}$$

is a Gaussian kernel function; h represents a magnitude of a bandwidth; and $n_i$ represents the number of the ordinary nodes in a certain spherical region $S_h$ having a radius of h.

4. The method of claim 3, wherein $S_h$ is defined as:

$$S_h(n) = \{y : (y - n_i)^T (y - n_i) < h^2\},$$

where y represents the number of the nodes meeting a predetermined condition, T represents a transpose symbol, and h represents a magnitude of a bandwidth.

5. The method of claim 4, wherein
performing topology building on the ordinary node clusters based on the breadth-first spanning tree algorithm is achieved by:
   randomly selecting a root node based on the breadth-first spanning tree algorithm to build the network topology; and
   the root node forwarding a cross-chain network request information from the ordinary nodes in the cluster to the gateway node for processing.

6. The method of claim 5, wherein the gateway node is such selected that:
the node showing the relatively high trust in historical transactions, and/or the node having the relatively long online time is selected as the gateway node.

7. A device for building a dynamic overlay network topology based on cross-chain interaction between blockchains, comprising a topology building module that is configured to perform steps of:
selecting at least one gateway node and at least one ordinary node from at least one cross-chain interaction node;
clustering the ordinary nodes into ordinary node clusters based on a clustering algorithm;
building a structured network topology and cross-chain connections between the cross-chain interaction nodes based on the gateway node; and
performing topology building on the ordinary node clusters based on a breadth-first spanning tree algorithm,
wherein selecting the at least one said gateway node is achieved by:
selecting the gateway node based on a trust of historical transaction information and/or an online time; and
after the gateway node is determined, naming the remaining cross-chain interaction node(s) as the ordinary node(s).

8. The device of claim 7, further comprising a route computing module that is configured to perform a routing algorithm involving:
acquiring routing tables maintained by the nodes;
comparing an address of the current node with a destination address specified in a received request message to see whether the two addresses are the same; if the two addresses are the same, determining that the message has arrived at the destination node, and ending performance of the routing algorithm;
if the two addresses are not the same, checking whether the routing table contains the destination address; if the routing table contains the destination address, performing forwarding directly;
if the routing table does not contain the destination address, determining whether a chain number of the node and the chain number of the destination are the same; if the chain number of the node and the chain number of the destination are the same, sending the message to the gateway node that is closest to that chain number for further processing; and
if the chain number of the node and the chain number of the destination are not the same, sending the message to the gateway node for processing.

9. The device of claim 7, wherein clustering the ordinary nodes into the ordinary node clusters based on the clustering algorithm is achieved by:
with the nodes having been assigned with corresponding coordinates, adjusting the specific coordinates of the nodes based on actual network latencies of the nodes; and
clustering the ordinary node based on a Meanshift clustering algorithm.

10. The device of claim 9, wherein,
a mean vector is recomputed during every iterative operation using the Meanshift clustering algorithm, in which the mean vector is computed using an equation of:

$$M_h(n) = \frac{\Sigma_{n_i \in S_h}\left[G\left\{\frac{n_i - n}{h}\right\} * (n_i - n)\right]}{\Sigma_{n_i \in S_h}\left[G\left\{\frac{n_i - n}{h}\right\}\right]}$$

where $$G\left\{\frac{n_i - n}{h}\right\}$$

is a Gaussian kernel function; h represents a magnitude of a bandwidth; and $n_i$ represents the number of the ordinary nodes in a certain spherical region $S_h$ having a radius of h.

11. The device of claim 10, wherein $S_h$ is defined as:
$S_h(n) = \{y : (y - n_i)^T (y - n_i) < h^2\}$,
where y represents the number of the nodes meeting a predetermined condition, T represents a transpose symbol, and h represents a magnitude of a bandwidth.

12. The device of claim 11, wherein
performing topology building on the ordinary node clusters based on the breadth-first spanning tree algorithm is achieved by:
randomly selecting a root node based on the breadth-first spanning tree algorithm to build the network topology; and
the root node forwarding a cross-chain network request information from the ordinary nodes in the cluster to the gateway node for processing.

13. The device of claim 12, wherein the gateway node is such selected that:
the node showing the relatively high trust in historical transactions, and/or the node having the relatively long online time is selected as the gateway node.

* * * * *